United States Patent [19]
Whaley

[11] Patent Number: 5,251,942
[45] Date of Patent: Oct. 12, 1993

[54] SELF-SEALING PIPE THREAD

[76] Inventor: Kent R. Whaley, R.R. #1, P.O. Box 6A, Wheaton, Minn. 56296

[21] Appl. No.: 846,060

[22] Filed: Mar. 5, 1992

[51] Int. Cl.$^5$ .............................................. F16L 19/00
[52] U.S. Cl. .................................................... 285/355
[58] Field of Search .............. 285/334, 355, 422, 390, 285/333, 332.3, 260

[56] References Cited

U.S. PATENT DOCUMENTS

| | | | |
|---|---|---|---|
| 2,017,362 | 4/1933 | Werder | 285/334.4 |
| 2,258,066 | 10/1941 | Oyen | 285/334 X |
| 2,333,909 | 11/1943 | Williams | 285/332.4 |
| 2,932,531 | 4/1960 | Briechle | 285/332.3 X |
| 2,971,780 | 2/1961 | Bauer | 285/215 |
| 3,467,413 | 9/1969 | Modrelle | 285/334 X |
| 3,747,960 | 7/1973 | Bawa | 285/39 |
| 4,426,105 | 1/1984 | Plaquin et al. | 285/92 |
| 4,484,769 | 11/1984 | Lacey | 285/12 |
| 4,736,967 | 4/1988 | Mott et al. | 285/333 |
| 4,822,081 | 4/1989 | Blose | 285/334 |
| 5,078,430 | 1/1992 | St. Onge | 285/355 |

*Primary Examiner*—Richard E. Moore
*Attorney, Agent, or Firm*—Schroeder & Siegfried

[57] ABSTRACT

A self-sealing pipe thread provides a connection for internally pressurized PVC pipes without the necessity of using sealant, O-rings, or gaskets. The thread holds pressure inside of the pipe and does not let gas or liquid to come in contact with any of the other threads. The sealing thread is provided by the tangential intersection between a flat annular sealing surface integrally formed on the head of the inside pipe thread and an annular line edge defining the inside edge of the ring step on the base of the outside pipe thread.

10 Claims, 1 Drawing Sheet

U.S. Patent — Oct. 12, 1993 — 5,251,942
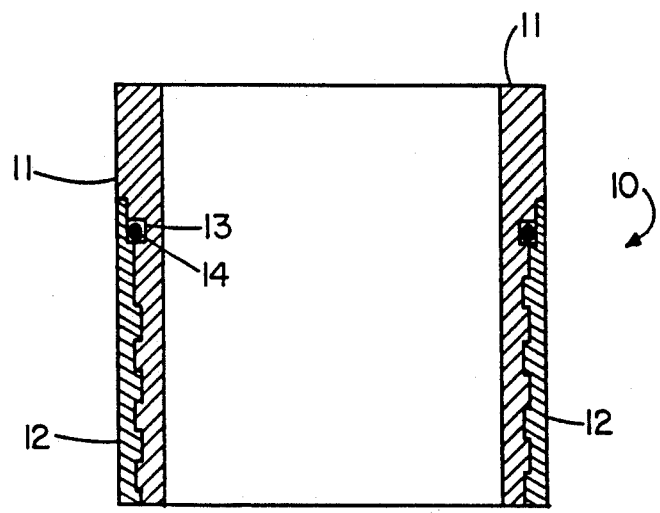
FIG. 1 - PRIOR ART
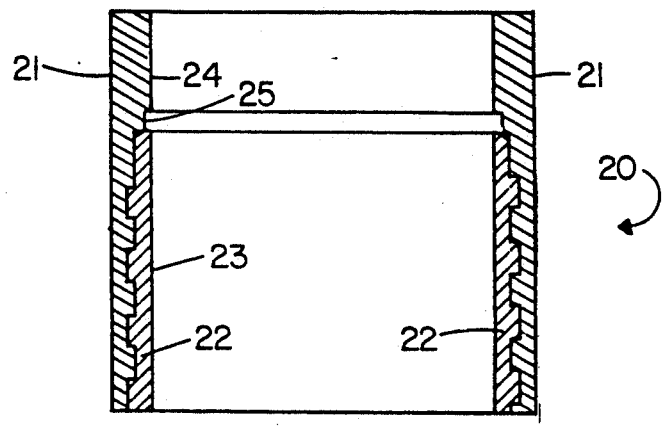
FIG. 2
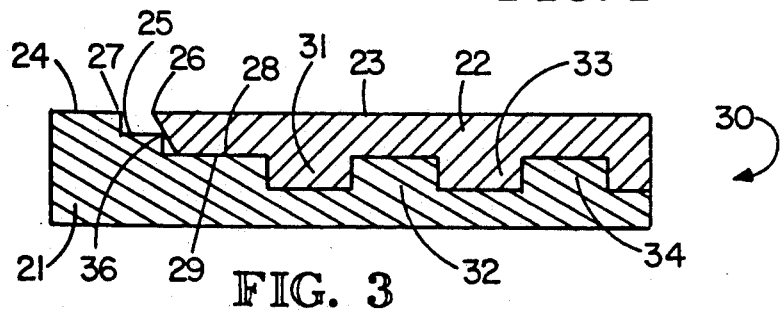
FIG. 3
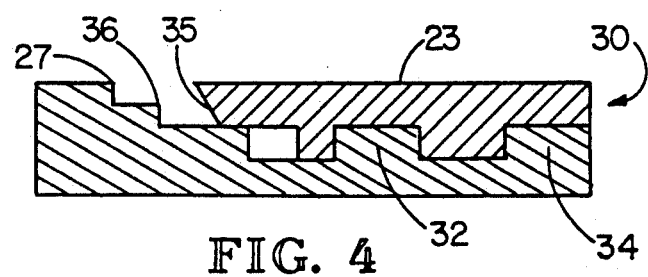
FIG. 4

SELF-SEALING PIPE THREAD

DESCRIPTION

Background of the Invention

1. Field of the Invention

This invention relates to a self-sealing pipe thread, and in particular to such a self-sealing pipe thread of the type providing a sealed pressure joint connection between two pipes without the use of sealants, O-rings or gaskets.

2. Discussion of the Technical Problems

The sealably joining of two pipes having a similar diameter presents a difficult problem. In the past, to connect two pipes laid open end to open end, larger diameter collars or the like needed to be used in order to provide a uniform inside diameter at the joint. If the outside diameter of the connected pipes must also remain uniform, such a collar or double female connection is unacceptable.

Threading the inside of one end of one pipe and the outside of one end of the other pipe would seem to be a solution, and such an arrangement does work to make both the inside and the outside diameters uniform. Unfortunately, such double threading only provides a connection, but does not seal against pressurized gas or liquid. If pressure is applied to a fluid within the pipe, the fluid leaks through the threads. In order to seal such a connection it is necessary to use a gasket, O-ring, or thread sealant such as cement.

Where pipe is used in water well applications and other applications in which the pipe or casing is inserted in the ground vertically in sections, it has been found that if the pipe must be removed, the connections between sections must be broken. If the joint is made with a sealant, the sealant must therefore be removed and reapplied. If the joint is made with an O-ring or gasket, the O-ring or gasket may become dislodged, and must be reapplied. The failure to reseal such a connection would subject the entire pipe to leakage.

The connection of polyvinyl chloride (PVC) pipes is particularly a problem, because the breaking of the connection, may break the pipe and require a whole new section of pipe. Additionally, the extra step of placing a gasket, O-ring, or sealant on the pipe, requires additional labor and presents one more step that may inadvertently be omitted, resulting in a leaking connection.

It has been found that the ends of PVC pipe can be successfully machined to produce secure connections using flat threads. Unfortunately, even with such threads sealants, gaskets and O-rings have in the past been required to make sure that the joint is leak proof against pressurized fluids. If the joint is to be broken (unthreaded), the preferred method of sealing is to use one or more O-rings placed in grooves in the pipe threads. The pipe end having outside threads in such an arrangement is known as the "pin" end and the pipe end having inside threads is known as the "box" end. The O-ring is usually placed in a groove in the pin end at the base of the threads where the box end fits over the O-ring to squeeze the O-ring into the groove, thus making the sealed connection. Unfortunately, the rotation of the box end over the O-ring tends to dislodge and/or to cut the O-ring. If such a damaged O-ring is not detected, a leaking connection may result. Also the O-ring arrangement subjects all of the threads to the liquid being carried in the pipe, since the seal is at the base of the threads of the pin end and at the head of the threads of the box end. If fluid is thus under pressure, the box end will expand, resulting in leakage or even the bursting of the joint.

As previously mentioned, prior art flat threads have been invented to provide uniform smooth constant diameter pipe joints in PVC pipes using grooves and O-rings.

While prior art devices disclose such threads and the use of O-rings, gaskets and sealants to provide a seal against pressurized fluids, there are no known examples of self-sealing threads for making pressure tight joints in PVC pipes that do not require the use of O-rings, gaskets or sealants. The instant invention is directed to such a need. Wherever hereinafter the term "self-sealing pipe thread" is utilized, it is intended to connote a pipe thread which seals the connection without the need for an O-ring, gasket or sealant to perfect the seal against the passage thereby of pressurized fluids.

The instant invention thus provides a self-sealing pipe thread used to produce an end to end uniform joint connection for PVC pipes without the necessity of using a sealant, O-rings, or gaskets. The sealing thread holds pressure inside of the pipe and does not let gas or liquid come in contact with any of the other threads. The sealing thread is a co-acting two part thread machined into the pipe ends. A flat annular surface is machined at an angle on the head of the pin end of one pipe, and a ring step is machined on the thread base on the box end of the other pipe. The tangential intersection between the flat annular surface on the pin end and the annular line edge defining the inside edge of the ring step on the box end produces the self-sealing thread of the invention. As pressure is applied internally to the pipes so joined, the pin end is urged radially outwardly, thus tightening the seal against the box end along the line defining the inside edge of the ring step on the box end. Upon removal of the internal pressure the pipes may be unthreaded. The rejoining of the pipes only requires that the pipes be threaded together once more.

The instant invention is thus directed to providing a self-sealing pipe thread as so far explained, as well as to other needs as explained in the following summary.

BRIEF SUMMARY OF THE INVENTION

It is a feature of the invention to provide a self-sealing pipe thread.

It is another feature of the instant invention to provide a uniform diameter pipe joint.

It is another feature of the instant invention to provide a self-sealing pipe thread not requiring the use of O-ring, gaskets or sealants to provide a pipe joint capable of withstanding internal fluid pressure without leaking.

It is yet another feature of the instant invention to provide a self-sealing pipe thread for joining PVC pipe without subjecting the threads to fluid pressure.

It is yet another feature of the instant invention to provide a self-sealing pipe thread for joining PVC pipe that can be broken and resealed by unthreading and re-threading the pipe sections.

These and other features and objects are attained according to the instant invention by providing a self-sealing pipe thread used to produce an end to end uniform joint connection for PVC pipes without the necessity of using a sealant, O-rings, or gaskets. The sealing thread hold pressure inside of the pipe and does not let gas or liquid come in contact with any of the other threads. The sealing thread is a co-acting two part thread machined into the pipe ends. A flat annular sealing surface is machined on the head of the pin end of one pipe at an angle to the longitudinal center of the pipe and a ring step is machined on the thread base on the box end of the other pipe. The tangential intersection between the flat annular sealing surface on the pin end and the line edge defining the inside edge of the ring step on the box end, produces the self-sealing thread of the invention. As pressure is applied internally to the pipes so joined, the pin end is urged radially outwardly, thus tightening the seal against the box end. Upon removal of the internal pressure the pipes may be unthreaded. The rejoining of the pipes only requires that the pipes be threaded together once more.

BRIEF DESCRIPTION OF THE DRAWINGS

The advantages of this invention will become apparent upon consideration of the following detailed disclosure of the invention, especially when taken in conjunction with the accompanying drawings, wherein:

FIG. 1 is a longitudinal sectional view of a prior art type of sealing pipe thread showing the threaded inside box end and the threaded outside pin end with a groove and O-ring.

FIG. 2 is a longitudinal sectional view of a self-sealing pipe thread showing the angled sealing surface of the pin end and the ring step and annular line edge of the box end in accordance with the present invention.

FIG. 3 is a partial sectional view of the self-sealing pipe thread showing the pin end and the box in sealed relationship in accordance with the present invention.

FIG. 4 is a partial sectional view of the self-sealing pipe thread showing the pin end and the box end in a partially unthreaded, and therefore an unsealed, relationship in accordance with the present invention.

DETAILED DESCRIPTION OF THE INVENTION

With reference to FIG. 1, it can be seen that the pipe thread 10 of the prior art of the invention is shown in which the outer thread portion or box end 12 is sealed with respect to the inner thread portion or pin end 11 by the use of an O-ring 14 situated in a groove 13 in the pin end 11. As can be seen by reference to FIG. 1, the prior art allows the fluid under pressure to seep into the threaded area all the way up to the O-ring and if the pressure is great enough, to expand the box end and thus cause the seal at the O-ring to leak.

On the other hand, the instant invention 20, as shown in FIG. 2, provides a more positively sealed thread without the need for O-rings or sealants. The invention 20 includes a box end 21 and a pin end 22. Box end 21 is threaded with flat threads on the inside diameter and is thus a female end similar to box end 12 of the prior art shown in FIG. 1. Pin end 22 is threaded with corresponding and notching flat threads and is thus a male end similar to pin end 11 of the prior art shown in FIG. 1, except that no provision is made at its inner end for the reception of an O-ring. The inner wall 24 of box end 21 is provided with an annular groove 25 cut into wall 24 near the base end of the threaded area of box end 21. Groove 25 produces a step in the topology of inner wall 24 which is best illustrated in FIGS. 3 and 4.

Now with reference to FIG. 3, it can be seen that the invention is depicted in a partial sectional view in which the invention 30 is shown only at one side of the two pipes. Groove 25, by being cut into the wall provides a step to the inside land 29 of the threads cut into the inner surface of wall 24, since the threads have cut away the inner wall to land 29, thus creating a step out of groove 25. The step thus provided has an annular line edge 36 which defines a circle and is depicted as a sectional right angle but could be any sharp angle. The remaining lands 32 and 34 are thread lands cut into the box end 21 as previously explained.

Continuing with reference to FIG. 3, it can be seen that the pin end 22 is also depicted in threaded relationship to box end 21. The inside end surface of pin end 22 at the head of the threads terminates at an edge 26 and slopes outwardly therefrom at an acute angle, to the outside. As can be seen in both FIGS. 3 and 4, sloping surface 35 presents a tangential surface to the line edge 36 of the step formed by groove 25. When considered in all three dimensions, line edge 36 defines a circle and plane 35 is an annular surface which slopes forwardly and radially inwardly as an angled sealing surface. When pin end 22 is inserted into box end 21 and the two ends are threaded together, surface 35 bears against line edge 36 to complete a seal. It should be noted that inside fluid pressure only serves to press ring surface 35 more firmly against line edge 36 to thereby more effectively seal the ends together. It should be noted that while line edge 36 can present any appropriate sharp angle, sealing surface 35 can likewise present any appropriate angle to line edge 36 and still create the seal as previously described with various degrees of success.

Although specific applications, materials, components, connections, sequences of events, and methods have been stated in the above description of the preferred embodiment of the invention, other suitable materials, other applications, components and process steps as listed herein may be used with satisfactory results and varying degrees of quality. In addition, it will be understood that various other changes in details, materials, steps, arrangements of parts, and uses which have been herein described and illustrated in order to explain the nature of the invention will occur to and may be made by those skilled in the art, upon a reading of this disclosure, and such changes are intended to be included within the principles and scope of this invention as hereinafter claimed.

I claim:

1. A self-sealing pipe thread for use in joining two internally pressurized plastic pipes of equal threadable diameters comprising:

(a) an outside threaded pipe pin end having a thread base and a thread head, wherein said thread head terminates in an integral annular sealing surface which slopes rearwardly and radially outwardly from the inner surface of said pipe end;

(b) an inside threaded pipe box end having a thread base and a thread head and having an inwardly projecting annular line edge disposed on the inside surface of said pipe box end proximal to said thread base;

(c) said annular sealing surface of said pipe pin end extending radially substantially entirely outside the innermost surface area of said pipe box end;

(d) said annular sealing surface and said annular line edge intersecting only substantially tangentially whereby the internal pressure of the internally pressurized plastic pipe causes a pressurized fluid seal to be perfected between said pipe pin end and said pipe box end; and (e) said pipe pin end and said box end being devoid of other sealing elements.

2. The self-sealing pipe thread as described in claim 1, further comprising square threads on the outside of said pin end.

3. The self-sealing pipe thread as described in claim 1, further comprising square threads on the inside of said box end.

4. The self-sealing pipe thread defined in claim 1, wherein said box end and said pin end of said pipe is comprised of one of a group of plastic materials consisting of polyvinyl chloride, poly-ethylene, and poly-propylene.

5. The self-sealing pipe thread as described in claim 1, wherein said box end and said pin end of said pipe is comprised of polyvinyl chloride material.

6. The self-sealing pipe thread defined in claim 1, wherein said annular line edge is comprised of material having a hardness essentially equal to the hardness of the material from which said annular sealing surface is formed.

7. A self-sealing pipe thread for use in joining two internally pressurized plastic pipes of equal threadable diameters comprising:
 (a) an outside threaded pipe pin end having a thread base and a thread head, wherein said thread head terminates in a annular conical sealing surface which slopes rearwardly and radially outwardly relative to the inner surface of said pipe end;
 (b) an inside threaded pipe box end having a thread base and a thread head and having an inwardly projecting annular line edge disposed on the inside surface of said pipe box end proximal to said thread base;
 (c) said annular surface of said pipe pin end extending radially substantially entirely outside the innermost surface area of said pipe box end;
 (d) said annular surface and said annular line edge intersecting only substantially tangentially whereby the internal pressure of the internally pressurized plastic pipe causes a pressurized fluid seal to be perfected between said pipe pin end and said pipe box end; and
 (e) said pipe pin end and said box end being devoid of other sealing elements therebetween.

8. The self-sealing pipe thread defined in claim 7, wherein said annular line edge is comprised of material having a hardness substantially equal to the hardness of the material from which annular sealing surface is formed.

9. A self-sealing pipe thread for use in joining two internally pressurized plastic pipes of equal threadable diameters comprising:
 (a) an outside threaded pipe pin end having a thread base and a thread head, wherein said thread head terminates in an annular sealing surface which slopes rearwardly and radially outwardly relative to the inner surface of said pipe end;
 (b) said annular sealing surface being integral with said thread head;
 (c) an inside threaded pipe box end having a thread base and a thread head and having an inwardly projecting annular line edge disposed on the inside surface of said pipe box end proximal to said thread base;
 (d) said annular surface and said annular line edge intersecting only tangentially whereby the internal pressure of the internally pressurized plastic pipe causes a pressurized fluid seal to be perfected between said pipe pin end and said pipe box end; and
 (e) said pipe end and said pipe box end being devoid of other sealing elements therebetween.

10. The self-sealing pipe thread defined in claim 1, wherein said annular line edge is comprised of material having a hardness substantially equal to the hardness of the material from which said annular sealing surface is formed.

* * * * *